US009447962B2

(12) United States Patent
Kim

(10) Patent No.: US 9,447,962 B2
(45) Date of Patent: Sep. 20, 2016

(54) REFLECTIVE LIGHT-EMITTING BOARD

(71) Applicant: Deog Soo Kim, Yangju (KR)

(72) Inventor: Deog Soo Kim, Yangju (KR)

(*) Notice: Subject to any disclaimer, the term of this patent is extended or adjusted under 35 U.S.C. 154(b) by 0 days.

(21) Appl. No.: 14/403,423

(22) PCT Filed: Nov. 23, 2012

(86) PCT No.: PCT/KR2012/009985
§ 371 (c)(1),
(2) Date: Nov. 24, 2014

(87) PCT Pub. No.: WO2014/010795
PCT Pub. Date: Jan. 16, 2014

(65) Prior Publication Data
US 2015/0159857 A1    Jun. 11, 2015

(30) Foreign Application Priority Data
Jul. 9, 2012 (KR) .................. 10-2012-0074707

(51) Int. Cl.
*F21V 33/00* (2006.01)
*A63C 17/26* (2006.01)
*F21V 7/00* (2006.01)
*F21V 7/04* (2006.01)
*G02B 6/00* (2006.01)
*A63C 17/01* (2006.01)
*F21Y 101/02* (2006.01)
*F21Y 113/00* (2016.01)

(52) U.S. Cl.
CPC ............ *F21V 33/008* (2013.01); *A63C 17/26* (2013.01); *F21V 7/0008* (2013.01); *F21V 7/0083* (2013.01); *F21V 7/048* (2013.01); *G02B 6/00* (2013.01); *A63C 17/015* (2013.01); *A63C 2203/14* (2013.01); *A63C 2203/42* (2013.01); *F21Y 2101/02* (2013.01); *F21Y 2113/005* (2013.01)

(58) Field of Classification Search
USPC .................. 362/486, 511, 615, 612
See application file for complete search history.

(56) References Cited

U.S. PATENT DOCUMENTS

| 4,997,196 A * | 3/1991 | Wood ...................... 280/87.042 |
| 6,431,733 B2 * | 8/2002 | Seifert et al. ................. 362/459 |
| 6,540,384 B1 * | 4/2003 | Rosevear ...................... 362/486 |
| 6,802,636 B1 * | 10/2004 | Bailey, Jr. ..................... 362/555 |
| 7,677,748 B2 * | 3/2010 | Hou et al. ....................... 362/96 |
| 7,677,749 B2 * | 3/2010 | Chang et al. ................. 362/97.1 |

(Continued)

FOREIGN PATENT DOCUMENTS

| JP | 05-177027 A | 7/1993 |
| KR | 20-0177554 | 4/2000 |

(Continued)

OTHER PUBLICATIONS

International Search Report for PCT/KR2012/009985.

*Primary Examiner* — Laura Tso

(57) ABSTRACT

The disclosure relates to a board on which a user rides and enjoys riding for exercise and leisure purposes and, more particularly, to a reflective light-emitting board which allows various decorations for enjoyment and safety at night. The disclosure includes a transparent plate (100) having a form of plate and including reflective holes (110) formed therein, and light-emitting elements (10) for irradiating the plate (100), wherein light emitted from the light-emitting elements (10) are reflected by the reflective holes (110) thus providing the board with a visually attractive appearance.

15 Claims, 6 Drawing Sheets

(56) References Cited

U.S. PATENT DOCUMENTS

| | | | |
|---|---|---|---|
| 8,038,313 B1* | 10/2011 | Campbell | 362/183 |
| 8,246,187 B2* | 8/2012 | Cheong et al. | 362/97.1 |
| 8,414,167 B2* | 4/2013 | Borges | 362/486 |
| 8,814,403 B2* | 8/2014 | Khan | 362/486 |
| 2006/0198598 A1* | 9/2006 | Fang et al. | 385/146 |
| 2007/0121340 A1* | 5/2007 | Hoshi | 362/600 |
| 2010/0172153 A1* | 7/2010 | Ijzerman et al. | 362/612 |

FOREIGN PATENT DOCUMENTS

| | | |
|---|---|---|
| KR | 10-0798680 B1 | 1/2008 |
| KR | 10-1052723 | 7/2011 |
| KR | 20-2011-0008815 | 9/2011 |

* cited by examiner

REFLECTIVE LIGHT-EMITTING BOARD

CROSS REFERENCE RELATED APPLICATIONS

This application claims foreign priority of Korean Patent Application No. 10-2012-0074707, filed on Jul. 9, 2012 and International Patent Application No. PCT/KR2012/009985, filed on Nov. 23, 2012, which are incorporated by reference in their entirety into this application.

TECHNICAL FIELD

The disclosure relates to a board on which a user rides and enjoys utilizing for recreational and leisure-related purposes; and more particularly to a reflective light-emitting board in which reflective holes are formed in a plate and light emitted from light-emitting elements are diffusely reflected, thus assuring various visually engaging decorations and safety at night.

BACKGROUND ART

Generally, a board is a piece of leisure and sports equipment which is manufactured from an elongated plate and on which a user rides and enjoys the sensation of high speed movement. The board may be classified into a skateboard that is provided with casters, a surfboard that is used on the sea, a snowboard that is used on snow, and the like. In recent days, because extreme sports attract users' interest, various types of board-shaped sports equipment are being developed.

Among these boards, a skateboard is plate-shaped piece of sports equipment that is used in such a manner that a user rides on the board and slides down along a sloping road, or a user steps on the ground with his/her one foot and pushes the board to generate propulsive force before the user rides on the board with both his/her feet and changes a travelling direction by variation of positions of the feet. The skateboard differs from other board types in that it requires propulsive force to be generated by means of a user repeatedly pushing off from the ground with a rearward foot motion, thereby propelling the board, with the user thereon, forward. Decorative items must not be attached to the skateboard because the decorative items may serve as safety hazards and obstacles in the generation of a propulsive force.

For the purpose of exhibition of a user's personality or preference, some users attach desired pictures or printed matter on a plate of a skateboard. However, these decorative items cannot be seen after sundown, and enjoying the skateboard at night may also result in a user's injury.

In order to overcome the above problems, there is a need for a skateboard including a light-emitting unit that is proposed in Korean Utility Model Laid-Open publication No. 20-2011-0008815 (referred to as 'cited invention' hereinafter) that has been filed by the applicant.

As shown in FIG. 1, the cited invention is constructed in such a manner that a rim 200 is detachably provided along a circumferential surface of a board body 100 and the rim includes therein a light-emitting unit 132 so as to radiate light along the circumferential surface.

Since the cited invention includes the light-emitting unit 132 contained in the rim provided at the circumferential surface of the board body 100, a user's personality can be exhibited and safety at night can be assured. However, because the skateboard is utilized on the ground, it frequently collides with obstacles on the ground, thus increasing the possibility of breakage due to frequent collision of the light-emitting unit 132 contained in the rim provided at the circumferential surface of the board body 100

Furthermore, since the light-emitting unit 132 is provided at the circumferential surface of the board body 100 and radiates light in a predetermined angle range, the light is not radiated throughout the entire area of the board body 100, thereby it is impossible to assure neither a desired appearance nor adequate visibility at night.

DISCLOSURE

Technical Problem

Accordingly, the disclosure has been made keeping in mind the above problems occurring in the cited invention that has been filed by the applicant prior art, and an object of the disclosure is to provide a reflective light-emitting board in which light emitted from light-emitting elements are reflected by reflective holes formed in a transparent plate thus providing an attractive and visually engaging appearance, while assuring sufficient strength and safety at night.

Technical Solution

In order to accomplish the above object, the disclosure provides a reflective light-emitting board including a transparent plate having a form of plate and including reflective holes formed therein; and light-emitting elements for irradiating the plate, wherein light emitted from the light-emitting elements are reflected by the reflective holes thus providing the board with a visually attractive appearance.

An upper plate is attached to an upper surface of the plate to prevent introduction of extraneous substances into the reflective holes, and a lower plate is attached to a lower surface of the plate and a reinforcing member is attached to a lower surface of the lower plate to increase strength of the board.

Advantageous Effects

According to the disclosure, light emitted from the light-emitting elements are reflected by the reflective holes formed in the transparent plate and are thus radiated in a visually attractive manner, thus providing various decorative effects. Furthermore, the light is extensively radiated and sufficient safety at night is assured thanks to the diffuse reflection of the light.

In addition, since the upper plate is attached to the upper surface of the plate, it is possible to prevent introduction of extraneous substances into the reflective holes and breakage of the reflective holes. Furthermore, since the lower plate is attached to the lower surface of the plate and the reinforcing member is attached to a lower surface of the lower plate, strength of the plate is increased, thus avoiding risk of injury caused by breakage of the board.

BEST MODE

The disclosure proposes a reflective light-emitting board including a transparent plate having a form of plate and including reflective holes formed therein; and light-emitting elements for irradiating the plate, wherein light emitted from the light-emitting elements are reflected by the reflective holes thus providing the board with a visually attractive appearance. According to the disclosure, the light emitted from the light-emitting elements are diffusely reflected by the reflective holes formed in the plate, thus providing a variety of visually engaging decorations and assuring safety at night.

The scope and spirit of the disclosure are not limited to the embodiment described hereinbelow, and various modifications will occur to those skilled in that art without departing from the spirit of the disclosure. Furthermore, technical scope of the disclosure is not limited to the skateboard described hereinbelow, and may be applied to a surfboard, a snowboard and the like having a form of plate.

Hereinafter, a reflective light-emitting board according to the disclosure will be described in detail with reference to FIGS. 2 to 7 of the accompanying drawings.

Figure 1:
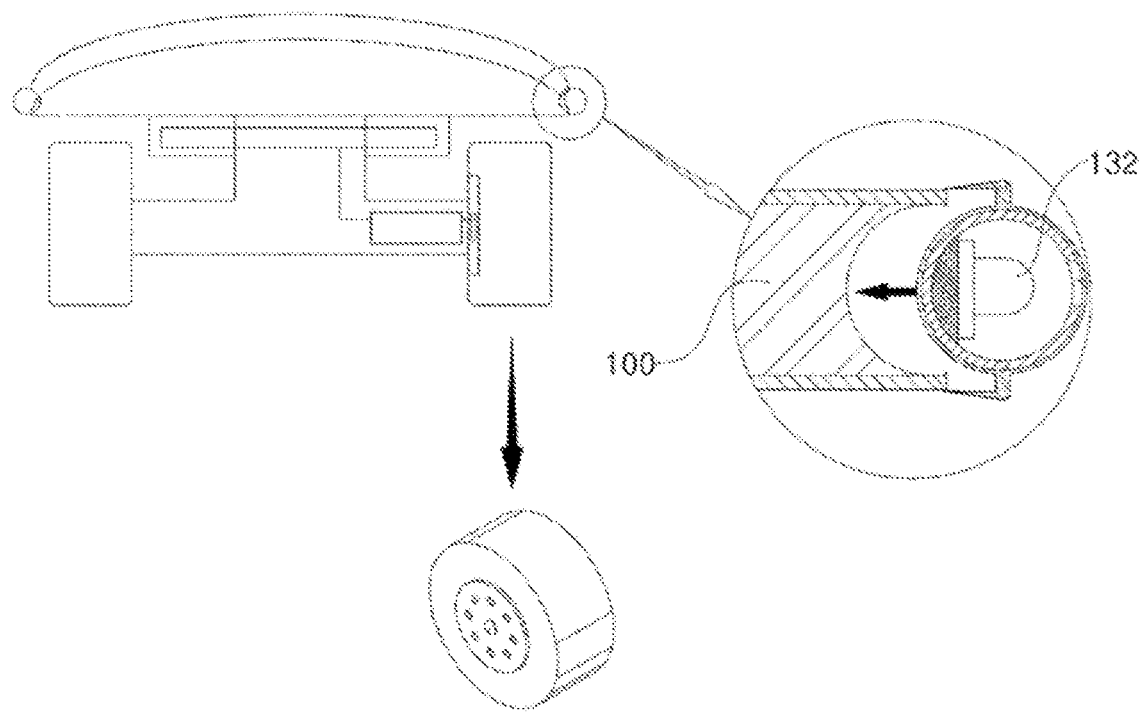
FIG. 1 is a perspective view showing a structure of a conventional light-emitting board.
Figure 2:
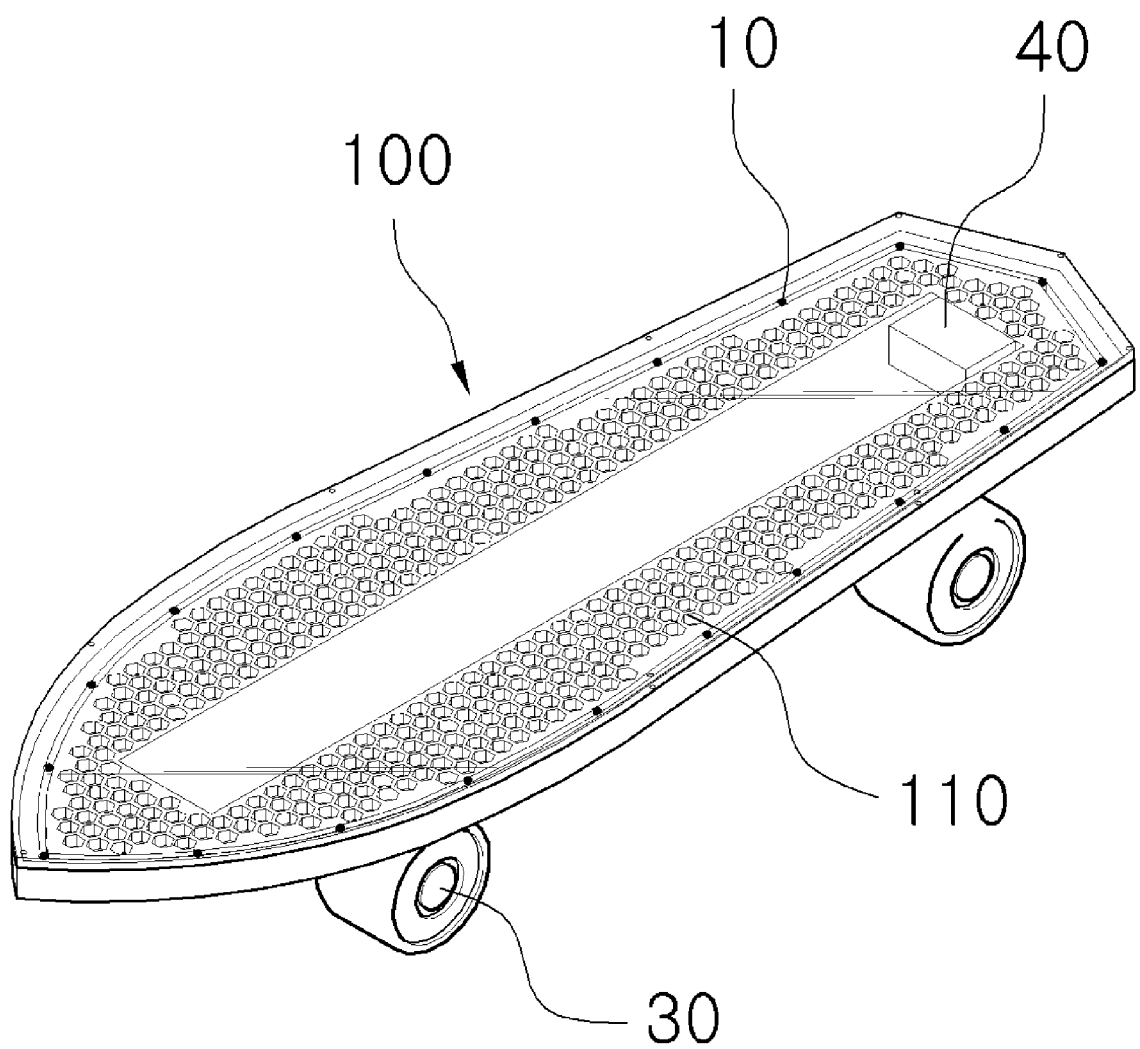
FIG. 2 is a perspective view showing a structure of a reflective light-emitting board according to the disclosure.

As shown in FIG. 2, the reflective light-emitting board according to the disclosure comprises a plate 100 in the form of plate on which the user's feet are placed, and casters 30 installed on a bottom surface of the plate 100, wherein the plate 100 is provided with light-emitting elements 10 and is formed with reflective holes 110 so as to reflect light emitted from the light-emitting elements 10.

The plate 100 is further provided with a power-supply unit 40 for supplying electric power to the light-emitting elements 10. The power-supply unit 40 may include a control unit for controlling the blinking of the light-emitting elements 10. Although not shown in the drawings, a switch may be provided on the bottom surface and the like of the plate 100 in order to turn on or off the light-emitting elements 10.

The plate 100 is configured to have a form of plate and is made of a transparent or translucent material so as to allow the light emitted from the light-emitting elements 10 to be transmitted therethrough, with the result that various decorative effects can be achieved thus exhibiting the user's personality.

Although the plate 100 is manufactured from a transparent synthetic resin, that is a representative fiber-reinforced plastic (FRP), it is limited thereto and may be manufactured from a variety of materials that assure a strength sufficient to construct the board. Alternatively, when the plate 100 is manufactured from mixture with luminous pigments, the plate 100 can produce the same effect as that obtained by the light-emitting elements 10 even without the light-emitting elements 10.

Figure 3:
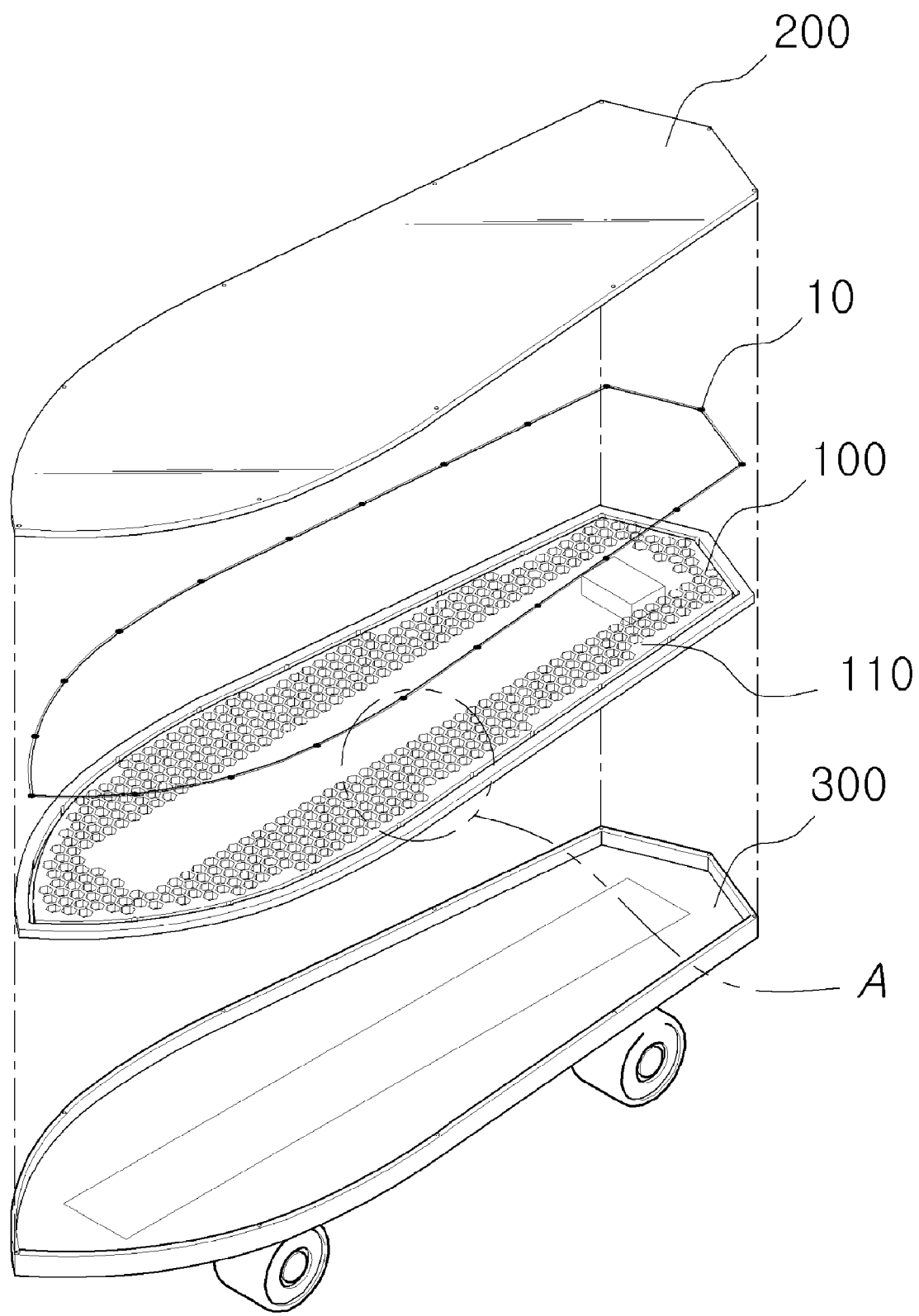
FIG. 3 is an exploded view showing the reflective light-emitting board according to the disclosure.

In some cases, the plate 100 may have a plurality of subsidiary plates provided on the upper or lower surface thereof. As shown in FIG. 3, an upper plate 200 is coupled to the upper surface of the plate 100 and a lower plate 300 is coupled to the lower surface of the plate 100. As a result, the strength of the plate 100 is increased, and thus injury that would otherwise be caused by breakage of the board can be avoided.

Since the upper plate 200 is coupled to the upper surface of the plate 100 on which the reflective holes 110 are formed, it is possible to prevent extraneous substances from being introduced into the reflective holes 110. In addition to the effect, the upper plate 200 further functions to hold the light-emitting elements 10 fitted in fitting holes 120 that are described later and to prevent extraneous substances from being introduced into the fitting holes 120. As a result, the reflective holes 110 are positioned in the board, thus preventing the reflective holes 110 from being broken.

Hereinafter, the disclosure will be described on the basis of the reflective light-emitting board that is constructed of three plates, that is, the plate 100 and the upper and lower plates 200, 300 coupled to the plate 100.

Although the light-emitting elements 10 or the reflective holes 110 may also be formed in the upper and lower plates 200, 300, they are most preferably formed in the plate 100. The description of this will be provided in the descriptions relating of the light-emitting elements 10 and the reflective holes 110.

When the light-emitting elements 10 and the reflective holes 110 are provided at the plate 100, the plate 100 is preferably manufactured from a transparent synthetic resin in order to assure the transmission and reflection of light. The upper and lower plates 200, 300 that are manufactured from a transparent, translucent or opaque synthetic resin enable the direction of radiation of the light to be changed.

For example, when the upper plate 200 is manufactured from a transparent synthetic resin and the lower plate 300 is manufactured from an opaque synthetic resin, the light is radiated only in an upward direction. Meanwhile, when the upper plate 200 is manufactured from an opaque synthetic resin and the lower plate 300 is manufactured from a transparent synthetic resin, the light is radiated only in a downward direction. In both the cases, the board emits the light only in one direction. When all the upper and lower plates 200, 300 and the plate 100 are manufactured from a transparent synthetic resin, the light is radiated in plural directions, thus radiating in the widest range. In this way, since the plate 100 is coupled with a plurality of plates such as the upper and lower plates 200, 300, the radiation direction of the light can be controlled depending on a user's preference thus enabling manufacture of boards having various configurations.

The light-emitting elements 10 include LEDs, and the light-emitting elements 10 having various colors such as white, blue and red colors may be provided at the periphery of the plate 100 as well as in the plate 100. Since the plate 100 is partially or entirely transparent or translucent and the light having various colors emitted from the light-emitting elements 10 is transmitted through the plate 100, the board can be attractively embellished and can assure safety even at night.

As shown in FIG. 3, the light-emitting elements 10 are provided in the plate 100 in plural numbers and the plurality of light-emitting elements 10 are connected to each other by means of electric wires. The light-emitting elements 10 are connected to the power-supply unit 40 and are turned on or off. Alternatively, the light-emitting elements 10 may generate electric power by themselves thus radiating light without being connected to the power-supply unit 40 by means of the electric wires.

Although the light-emitting elements 10 or the reflective holes 110 may also be provided at the upper plate 200 or the lower plate 300, it is most preferable that the light-emitting elements 10 are provided at the plate 100, as shown in FIG. 3. If the light-emitting elements 10 are provided at the upper plate 200 or the lower plate 300, the upper plate 200 or the lower plate 300 are apt to be subjected to collisions during riding of the board and thus there is a fear of breakage of the light-emitting elements 10 due to the collisions. In case of the plate 100 at which the light-emitting elements 10 are provided, the board can radiate light in the widest possible range.

When the light-emitting elements 10 are provided in the plate 100, the plate 100 is formed with the fitting holes 120 in which the light-emitting elements 10 are fitted, in order to prevent that the upper plate 200 or the lower plate 300 is abnormally coupled or the light-emitting elements are separated from the plate 100.

Figure 4:
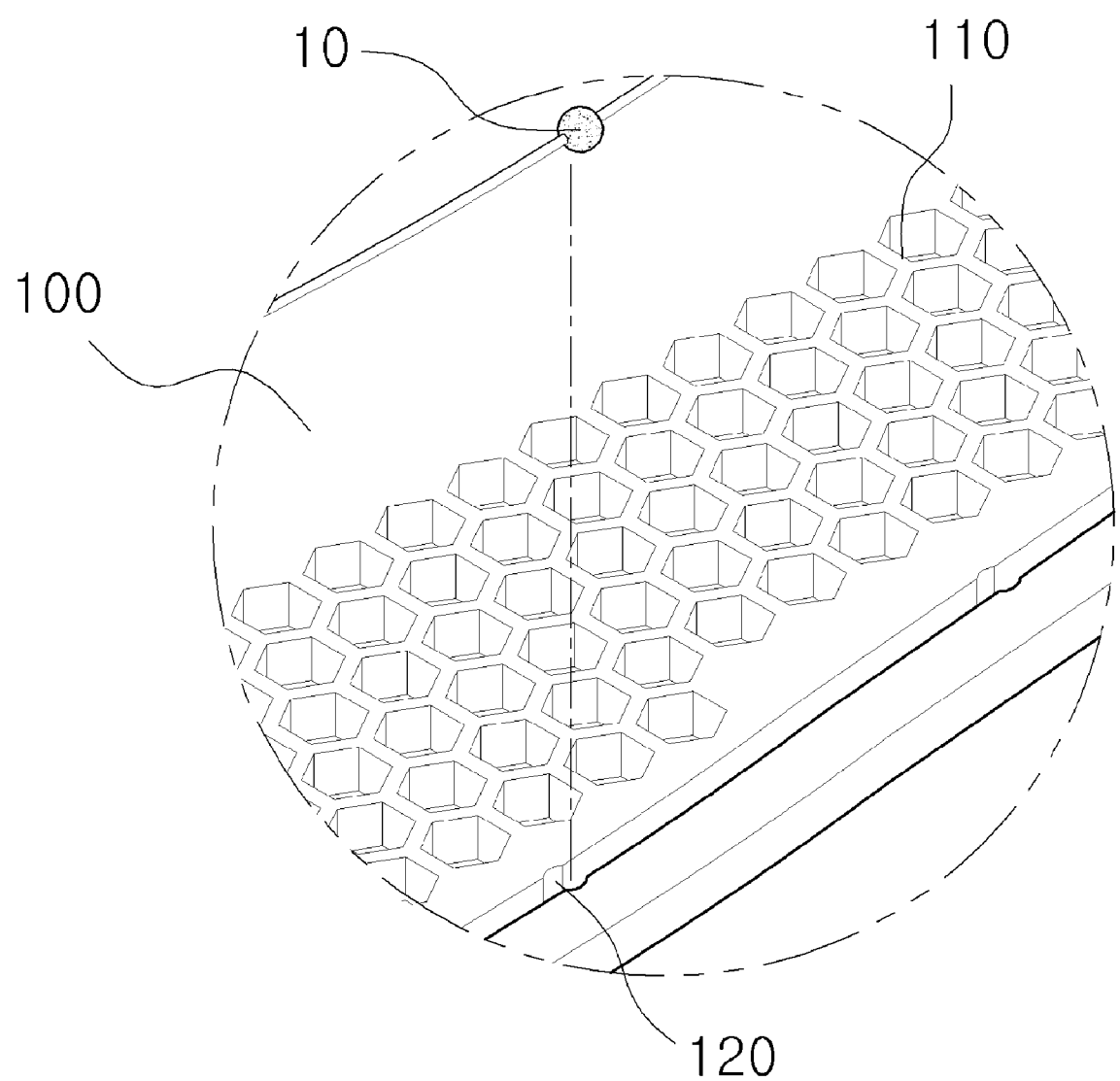
FIG. 4 is a partial enlarged view showing structures reflective holes and fitting holes formed in the reflective light-emitting board according to the disclosure.

As shown in FIG. 4, each of the fitting holes 120 may be formed into a shape of hole having a predetermined depth from the upper surface of the plate 100, and the light-emitting elements 10 are securely fitted in the fitting holes 120. When a plurality of light-emitting elements 10 that are connected to each other by means of electric wires are installed, an electric wire groove that communicates the plurality of fitting holes 120 with each other is formed in the plate so as to accommodate the electric wire.

Although the light-emitting elements 10 are illustrated as being installed in the fitting holes 120 formed along the peripheral area of the plate 100 as shown in FIGS. 3 and 4, they may be installed in the central area of the plate 100 without limitation in an installing position. However, in order to radiate light to the widest range, the light-emitting elements 10 must be installed at the peripheral area of the plate 100. At this point, it would be most preferable that the fitting holes 120 are formed in the peripheral area of the plate 100 at predetermined intervals.

The plate 100 is formed therein with the reflective holes 110 so as to reflect the light emitted from the light-emitting elements 10. In case of the plate 100 having no reflective hole 110, the light emitted from the light-emitting elements 10 are radiated only in a predetermined angle thus creating a visually attractive decorative effect difficult.

Figure 5:
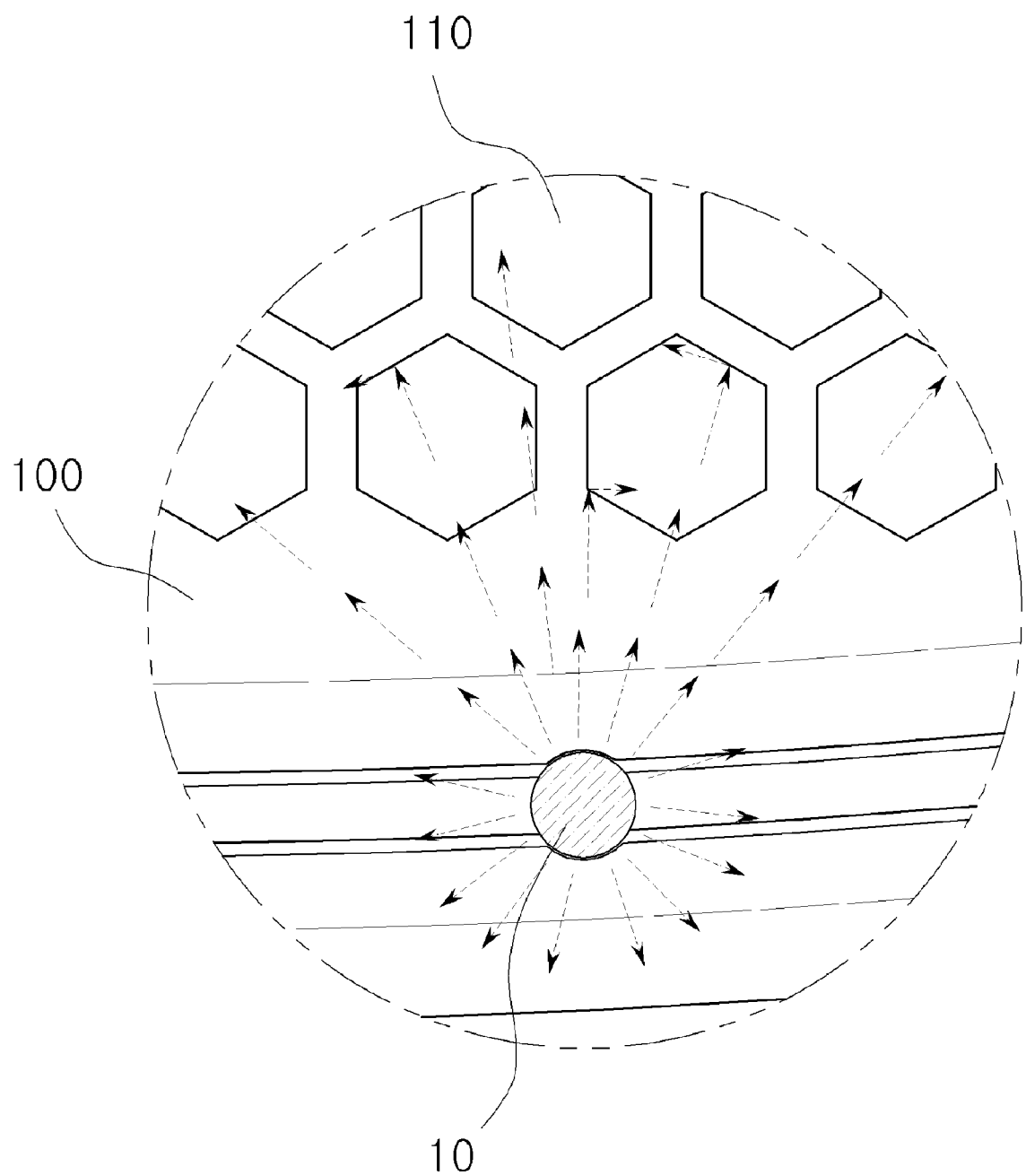
FIG. 5 is an enlarged view showing diffuse reflection of the light emitted from the light-emitting elements included in the reflective light-emitting board according to the disclosure.

As shown in FIG. 5, since air contained in the reflective holes 110 formed in the plate 100 is different from the material of the plate 100 in terms of optical medium, the light emitted from the light-emitting elements 10 are scattered or reflected while being transmitted through the different optical media, thus exhibiting a visually attractive decorative effect.

Each of the reflective holes 110 may have various sectional shapes such as circular and polygonal shapes. Although the reflective holes 110 each having a circular section cause the reflection, each of the reflective holes 110 is preferably configured to have a polygonal section in order to promote an extensive diffuse reflection, as shown in FIGS. 4 and 5. The light emitted from the light-emitting elements 10 are transmitted through the plate 100 and are then incident on the reflective holes 110 having the polygonal section, with the result that the light is reflected on the respective planes of the reflective holes 110 thus causing the extensive diffuse refection, as shown in FIG. 5.

The reflective holes 110 may be configured to have a square section, a hexagonal section, an octagonal section or the like according to the user's intention. The number of the reflective holes 110 may be changed so as to control a reflected amount of light. Since the plurality of reflective holes 110 are regularly formed in the plate 100, the light emitted from the light-emitting elements can be reflected in a wider range. By adjusting positions of the plurality of reflective holes 110 on the same plate 110, the light can be reflected according to the user's intention.

As shown in FIGS. 4 and 5, the reflective holes 110 may be configured into a honeycomb structure in which a unit cell thereof has a hexagonal section. At this point, since the confronting wall planes of the hexagonal hole face each other, the reflection of the light is more effectively achieved. Furthermore, since the plurality of reflective holes 110 are arranged into the honeycomb structure, the light is consecutively diffusely reflected thus allowing a visually attractive decorative light display.

As mentioned above, the plate 100 may be coupled with the upper plate 200 or the lower plate 300, and the reflective holes 110 may be formed in all the three plates. However, similarly to the light-emitting elements 10, it is most preferable that the reflective holes 110 are also formed in the plate 100.

If the reflective holes 110 are formed in the upper plate 200 or the lower plate 300, the strength of the board is possibly deteriorated. Meanwhile, if the reflective holes 110 are formed in the upper plate 200, use of the board may become inconvenient and probability of breakage of the reflective holes 110 is increased. Furthermore, since both the light-emitting elements 10 and the reflective holes 110 are provided at the plate 100, the light is more extensively radiated, compared to the case where they are provided at the upper plate 200 or the lower plate 300.

The reflective holes 110 may be formed in the center area as well as in the peripheral area of the plate 100 without restriction in disposition, and may be arranged in the desired disposition so as to achieve the user's intended illumination effects. Each of the reflective holes 110 may be formed into a shape of blind hole having a predetermined depth or a shape of through-hole.

Consequently, the light is attractively radiated thanks to the reflective holes 110 thus providing the board with various decorative effects. Furthermore, light is extensively radiated thanks to the diffuse reflection thus assuring sufficient safety at night.

The reflective light-emitting board according to the disclosure assures a substantial strength because it is manufactured from a transparent synthetic resin. The board is frequently subjected to collisions because it moves on the ground. In order to reinforce the board against the collisions, the lower plate 300 is coupled to the lower surface of the plate 100. For the purpose of more reliable reinforcement, the board may include a reinforcing member 20 couples to the lower surface of the lower plate 300.

Figure 6:
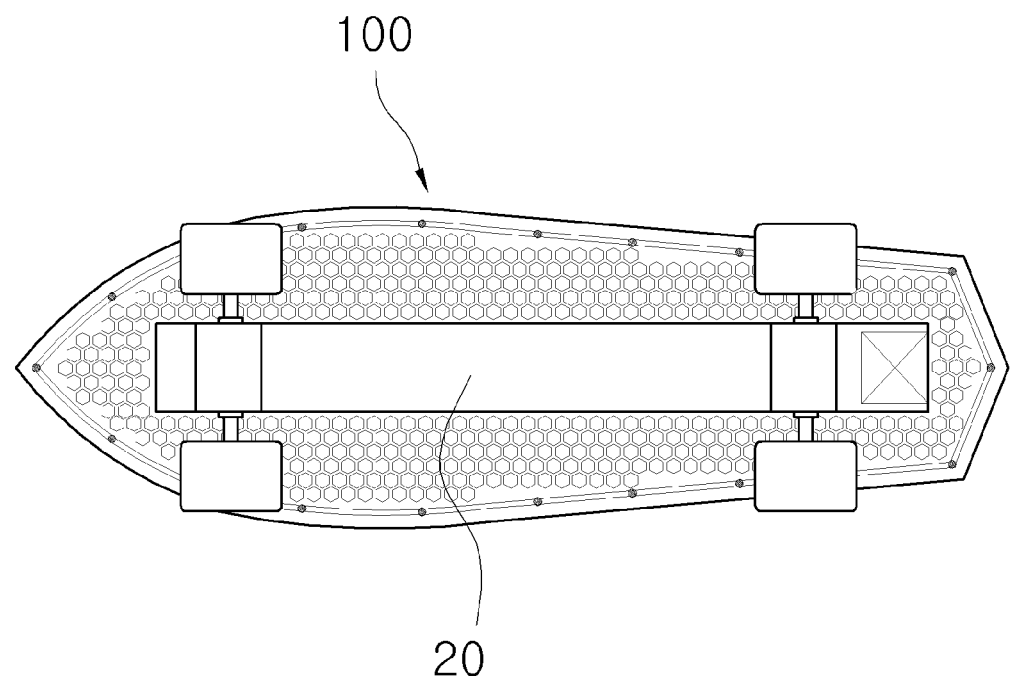
FIGS. 6 and 7 are schematic views showing the structure of the reflective light-emitting board according to the disclosure that is further provided with a reinforcing member.
Figure 7:
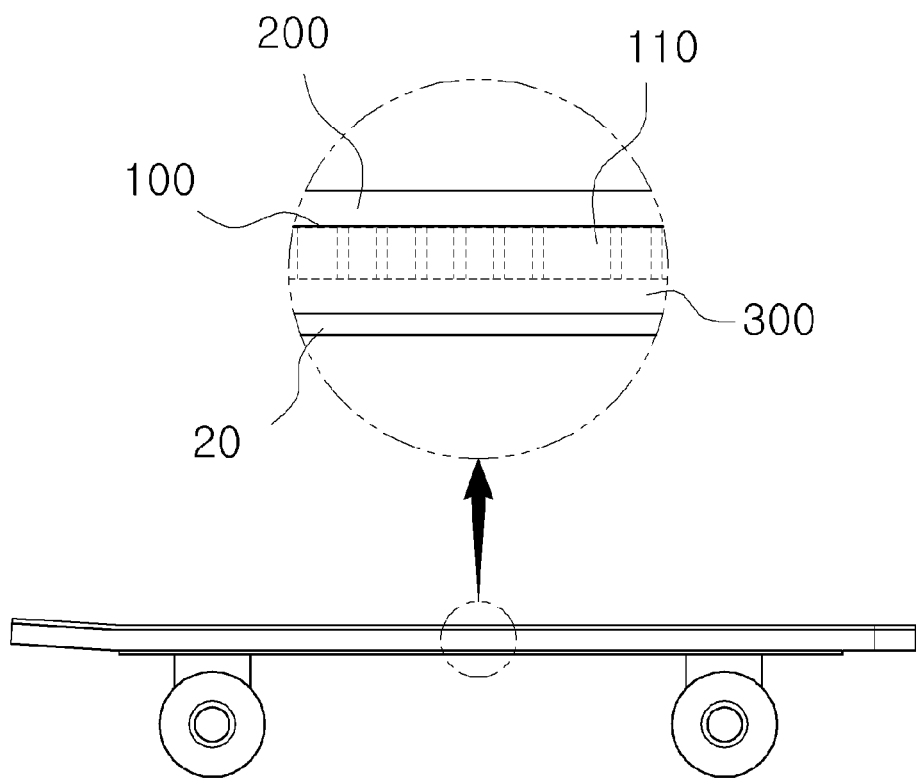

As shown in FIGS. 6 and 7, the reinforcing member 20 has an elongated rectangular shape and is attached to the lower surface of the lower plate 300. The casters 300 are installed to the lower surface of the reinforcing member 20. When the board is not manufactured from the plurality of plates but is manufactured from only a single plate 100, the reinforcing member 20 may be attached to the lower surface of the plate 100. The attachment of the reinforcing member 20 provides for sufficient strength to the reflective light-emitting board according to the disclosure thus assuring the user's safety.

As described above, the disclosure has advantageous effects that the light emitted from the light-emitting elements 10 installed on the plate 100 are diffusely reflected by the reflective holes 110 formed in the plate 100 and thus are more attractively radiated, thus providing the board with a decorative appearance. Furthermore, the light is extensively radiated by virtue of the diffuse reflection of the light; thus assuring sufficient safety at night.

In addition, since the upper plate 200 is attached to the upper surface of the plate 100, it is possible to prevent introduction of extraneous substances into the reflective holes 110 and breakage of the reflective holes 110. Furthermore, since the lower plate 300 is attached to the lower surface of the plate 100 and the reinforcing member 20 is attached to the lower surface of the lower plate 300, the strength of the plate 100 is increased thus preventing user's injury that may be otherwise caused by breakage of the board.

DESCRIPTION OF REFERENCE NUMERALS

10: light-emitting elements
20: reinforcing member
30: caster
40: power-supply unit
50: switch
100: plate
110: reflective hole
120: fitting hole
200: upper plate
300: lower plate

The invention claimed is:

1. An illuminated skateboard, comprising:
 a transparent plate with reflective holes formed therein; and
 a plurality of light-emitting elements contained within light fitting holes, wherein the light-emitting elements illuminate the transparent plate;
 wherein light emitted from the light-emitting elements in the light fitting holes are transmitted to and reflected by the reflective holes to provide the board with an illuminated appearance; and
 wherein the light-emitting elements are arranged in series along a peripheral area of the plate.

2. The illuminated skateboard of claim 1, wherein the reflective holes have a polygonal shape to cause a diffuse reflection of the emitted light.

3. The illuminated skateboard of claim 2, wherein the reflective holes are arranged in a honeycomb pattern and each of the reflective holes has a hexagonal shape.

4. The illuminated skateboard of claim 1, wherein the reflective holes are arranged in a regular pattern.

5. The illuminated skateboard of claim 1, further comprising an upper plate attached to an upper surface of the transparent plate to protect the reflective holes from intrusion of extraneous substances.

6. The illuminated skateboard of claim 1, further comprising a lower plate attached to a lower surface of the transparent plate to increase strength of the plate.

7. The illuminated skateboard of claim 6, further comprising a reinforcing member attached to a lower surface of the lower plate to increase the strength of the lower plate.

8. The illuminated skateboard of claim 5, wherein the upper plate is transparent.

9. The illuminated skateboard of claim 6, wherein the lower plate is transparent.

10. The illuminated skateboard of claim 1, wherein the light-emitting elements are light-emitting diodes (LED).

11. The illuminated skateboard of claim 1, further comprising a power supply unit for powering the light-emitting elements.

12. The illuminated skateboard of claim 1, wherein the reflective holes are empty.

13. The illuminated skateboard of claim 1, wherein the reflective holes do not contain a light-emitting elements.

14. The illuminated skateboard of claim 1, wherein the reflective holes and the light-emitting elements in the light fitting holes are in the same plane of the transparent plate.

15. A recreational or leisure board, comprising:
 a transparent plate with reflective holes formed therein;
 a plurality of light-emitting elements contained within light fitting holes, wherein the light-emitting elements illuminate the transparent plate;
 an upper plate attached to an upper surface of the transparent plate to protect the reflective holes from intrusion of extraneous substances;
 a lower plate attached to a lower surface of the transparent plate to increase strength of the plate; and
 a power supply unit for powering the light-emitting elements;
 wherein the upper plate, or the lower plate, or both are transparent;
 wherein the reflective holes and the light-emitting elements in the light fitting holes are in the same plane of the transparent plate;
 wherein light emitted from the light-emitting elements in the light fitting holes are transmitted to and reflected by the reflective holes to provide the board with an illuminated appearance; and
 wherein the light-emitting elements are arranged in series along a peripheral area of the plate.

* * * * *